United States Patent [19]

Leerskov, Jr. et al.

[11] 4,034,827
[45] July 12, 1977

[54] AIR GUN UTILIZING MAGNETIZED SHUTTLE

[75] Inventors: Arthur E. Leerskov, Jr., Sherman; John T. Thomson, Jr.; Frank J. Wilem, Jr., both of Dallas; Ernest R. Harrison, Jr., Plano; Edward C. Banas, Jr., Dallas, all of Tex.

[73] Assignee: Texas Instruments Incorporated, Dallas, Tex.

[21] Appl. No.: 564,931

[22] Filed: Apr. 3, 1975

[51] Int. Cl.² ........................................ G01V 1/38
[52] U.S. Cl. ............................ 181/120; 181/107; 181/111; 340/12 R; 324/34 PS; 324/34 D
[58] Field of Search .......... 181/107, 108, 110, 111, 181/113, 115, 120, 119; 340/12 R; 324/34 PS, 34 D

[56] References Cited

U.S. PATENT DOCUMENTS

| 3,653,460 | 4/1972 | Chelminski | 181/120 |
| 3,687,218 | 9/1970 | Ritter | 181/107 |
| 3,735,244 | 5/1973 | Gumtau et al. | 324/34 D |

Primary Examiner—Howard A. Birmiel
Attorney, Agent, or Firm—Harold Levine; Rene' E. Grossman; Thomas G. Devine

[57] ABSTRACT

Disclosed is an improved air gun construction which lends itself to use with a plurality or array of similarly improved air guns which enables easy synchronization and timing of such array of air guns relative to one another. In the preferred embodiment, the air gun comprises a shuttle having magnetic properties and an electrical coil in proximity to said shuttle. When the air gun is actuated and the shuttle is accelerated, a voltage is induced in the coil by the flux lines from the magnetized shuttle moving through the turns of the coil. Electrical circuit means associated with each gun senses when a predetermined voltage is induced in the coil and generates a timing signal for each air gun. Additional electrical circuit means phases each of the timing signals from the air guns to occur at a predetermined time to thereby insure firing each of the air guns accurately. The timing signals from each of the air guns are used in conjunction with additional signals to accurately indicate auto fire and no fire conditions of the air guns.

33 Claims, 28 Drawing Figures

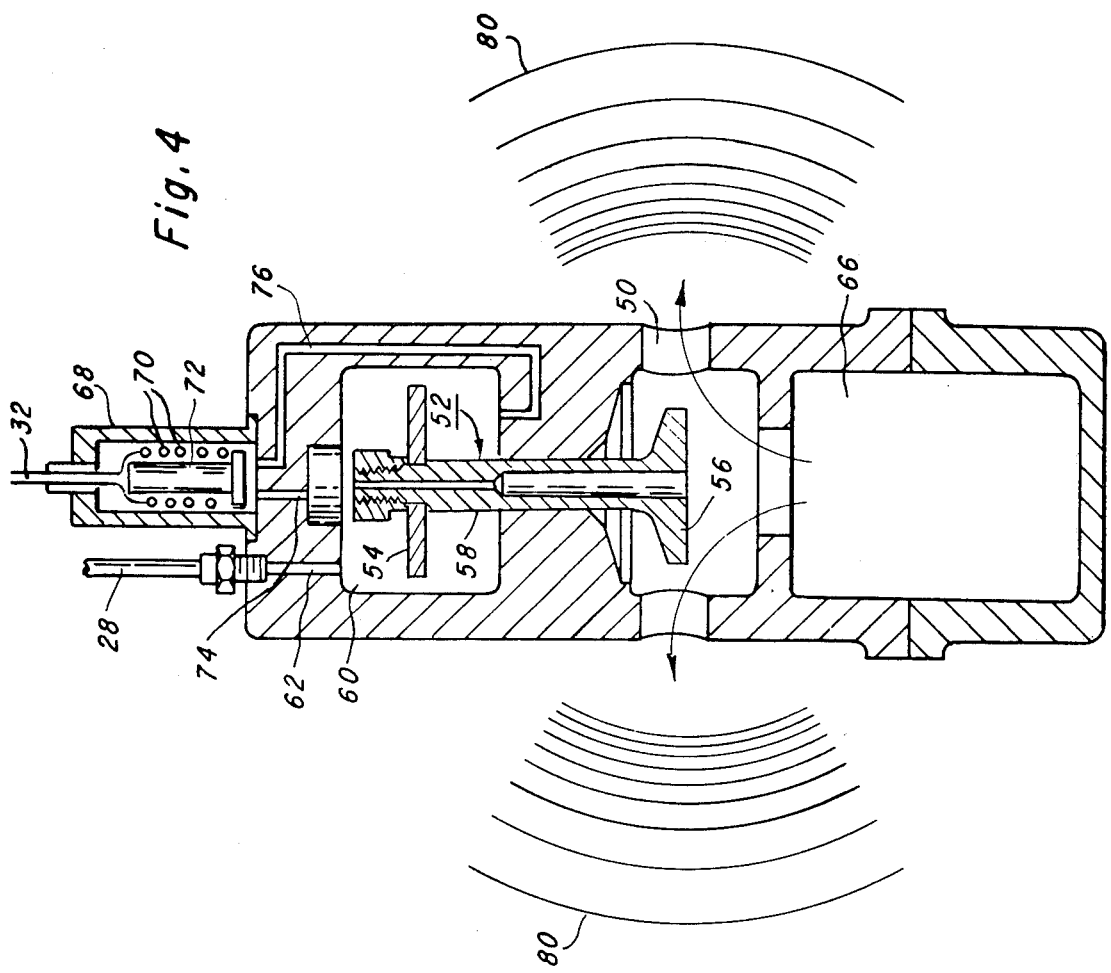
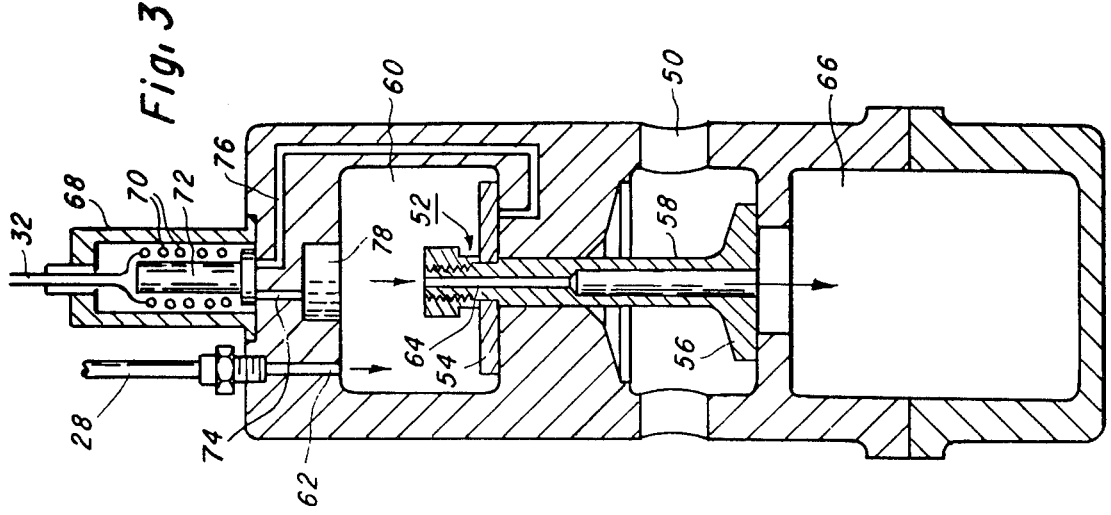

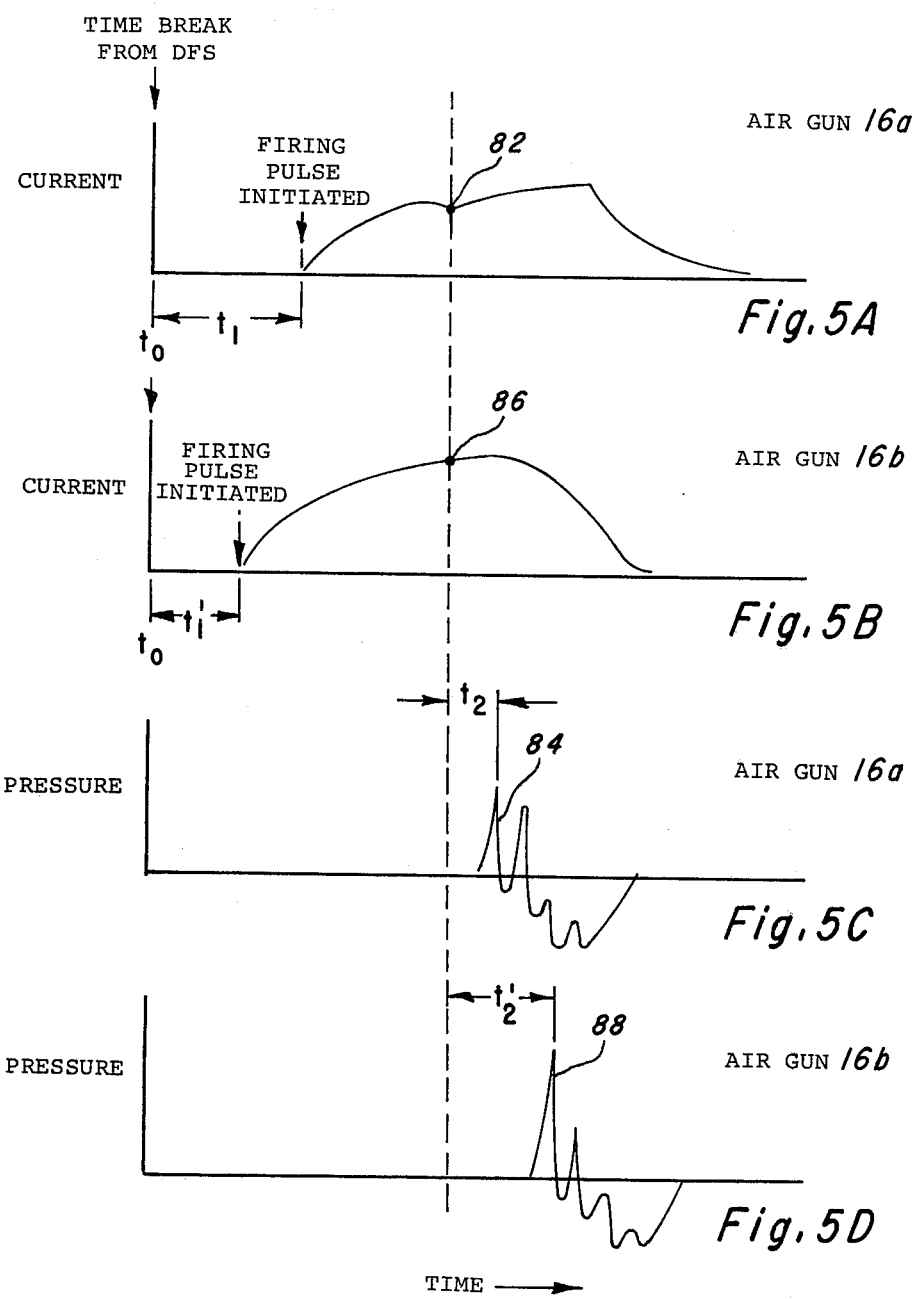

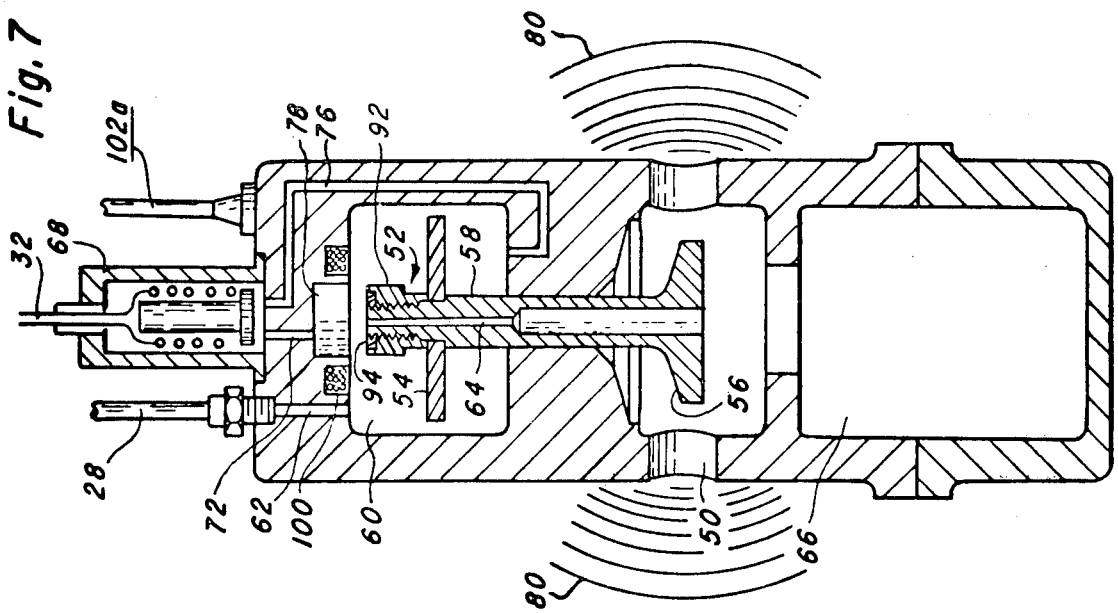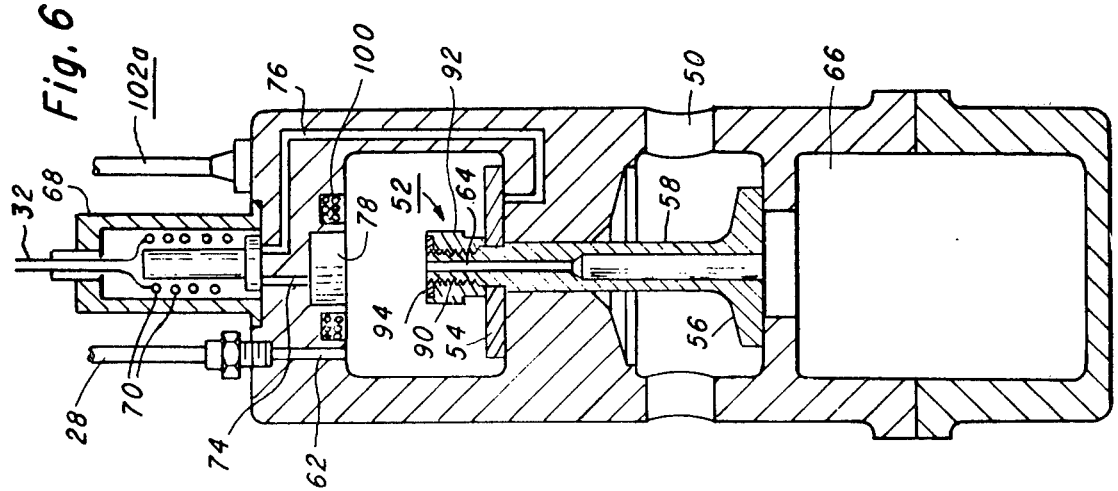

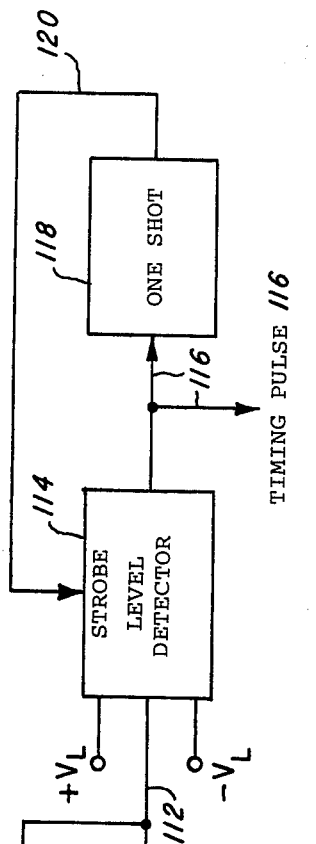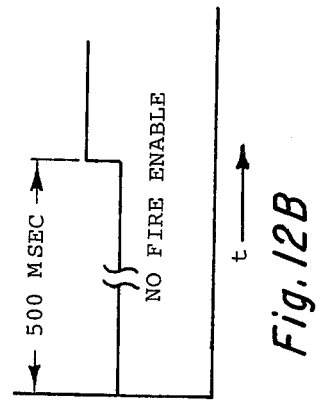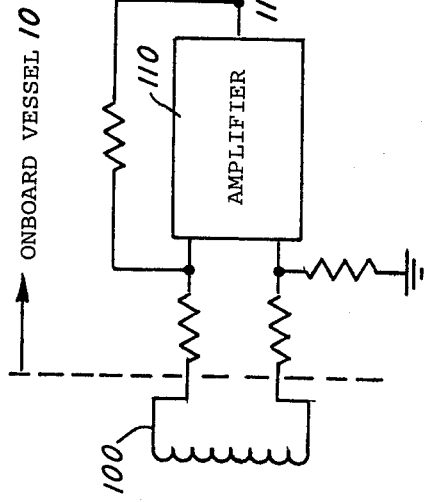

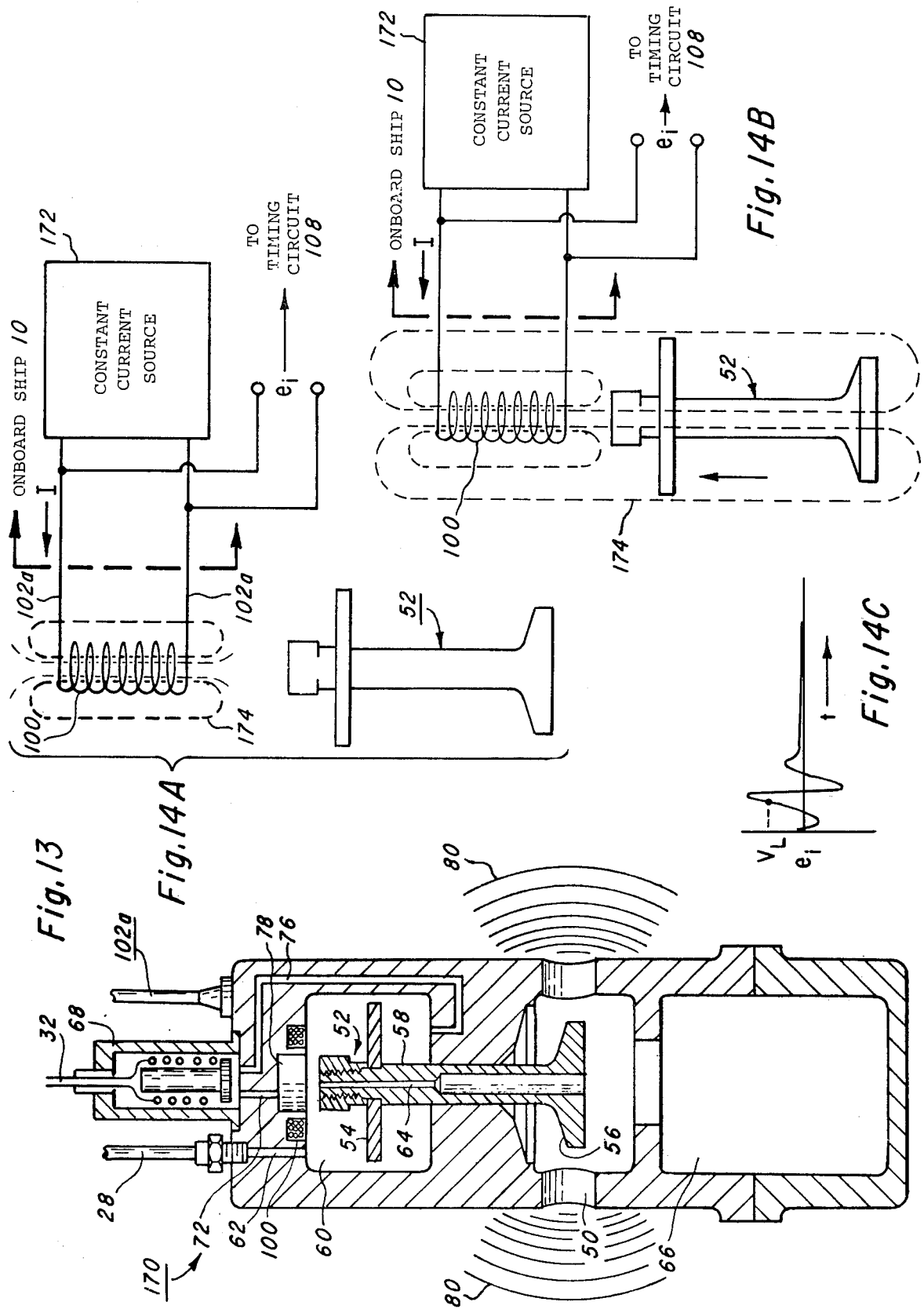

AIR GUN UTILIZING MAGNETIZED SHUTTLE

This invention relates to the generation of seismic energy in a medium by the use of seismic sources of the pressurized gas abrupt releasing type and more particularly to a method and apparatus for synchronizing and monitoring the firing of such seismic sources.

In seismic surveying in a medium such as water, acoustical energy is generated by the seismic sources submerged in the water and is utilized to investigate subsurface geological conditions and formations. For this purpose, one or more of such seismic sources, which are often called air guns, are submerged in the water; compressed air, or other gas or gases under pressure, is fed to the submerged source and temporarily stored therein. At the desired instant, the seismic source or sources are actuated, i.e., fired and pressurized gas is abruptly released into the surrounding water. In this manner powerful acoustic waves are generated capable of penetrating deeply into subsurface material to be reflected and refracted therein by the various strata and formations. The reflected or refracted acoustical waves are sensed and recorded to provide information and data about the geological conditions and formations.

It is also possible to submerge such seismic sources in marsh land, swamp or mud areas which are infused with sufficient water that the seismic surveying apparatus described herein can be used. Accordingly, the term "water" as used herein is intended to include marsh land, swamp or mud which contains sufficient water to enable such apparatus to be used.

It has been found advantageous in marine seismic exploration to generate a plurality of acoustic waves from an array of air guns in order to provide a composite acoustic wave of satisfactory amplitude and frequency content. Air guns having various volume capacities are generally utilized in such arrays in order to produce a composite acoustic wave having a broad frequency band, as air guns of different volumes generate acoustic waves with different frequency spectrums.

In the past, attempts have been made to synchronize the timing of the solenoid valve which triggers each individual air gun; however, the time at which the solenoid plunger is actuated (that time being at the occurrence of the "wicker point" which is defined as the point where the increasing current through the solenoid coil is perturbated as a result of a change in reluctance within the solenoid which is due in turn to the movement of the solenoid plunger) will vary with each solenoid and there are further variables caused by the mechanical structure of each air gun, such as dimensional tolerance variation, different frictional drag of moving parts, etc. When the individual air guns are not synchronized, the downgoing seismic waves are misaligned. This wave misalignment causes a loss of the high frequency energy. As the wave misalignment becomes severe, the amplitude of the downgoing seismic energy is severely attenuated and the bubble pulse cancellation action can be hampered. The net result then is a reduction in the total amplitude of the downgoing seismic energy, which results in poor penetration and poor resolution of the final data collected utilizing such a system.

Accordingly, it is an object of the present invention to provide a method and apparatus for accurately synchronizing and monitoring an air gun or air gun array.

Another object of the present invention is to provide a synchronizing and monitoring apparatus which does not interfere with or affect air gun operation.

Another object of the present invention is to provide a synchronizing and monitoring apparatus which requires only minimum modifications to existing air guns.

Another object is to reduce the misalignment of the downgoing seismic waves which results in poor penetration and poor resolution of the data obtainable.

A further object of the present invention is to provide a synchronizing and monitoring apparatus which will detect auto fires and no fires of air guns.

A still further object of the present invention is to provide a system which is inexpensive to produce yet reliable in continuous marine operation.

Other objects and features of the invention will become more readily understood from the following detailed description and appended claims when read in conjunction with the accompanying drawings, in which like reference numerals designate like parts throughout the figures thereof, and in which:

FIGS. 3 and 4 illustrate a prior art air gun in the armed and ready to fire position and the fired position, respectively.

FIGS. 5A–5D illustrate various waveforms generated by two prior art air guns.

FIGS. 6 and 7 illustrate an air gun constructed according to the present invention in the primed to fire position and fired position, respectively.

FIG. 11 illustrates a block diagram schematic representation of a timing pulse generator circuit according to the present invention.

FIG. 12A illustrates the electrical monitoring circuit utilized for generating an auto fire on no fire condition of an air gun constructed according to the present invention while FIG. 12B illustrates the "no fire enable" signal utilized in the circuit of FIG. 12A.

FIG. 13 illustrates another embodiment of the present invention utilizing a constant current approach.

FIGS. 14A and 14B schematically illustrate the operation of the embodiment shown in FIG. 13, while FIG. 14C illustrates the voltage induced in the sensor coil of the air gun of FIG. 13.

Figure 15:
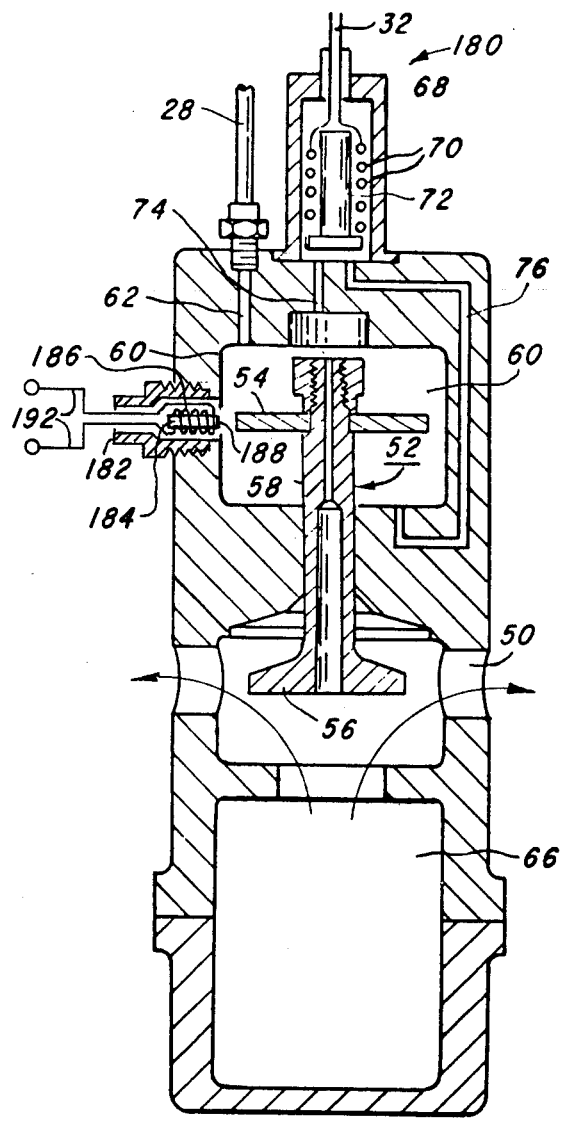

FIG. 15 illustrates a still further embodiment of the present invention utilizing a magnetic sensor.

Figure 16A:
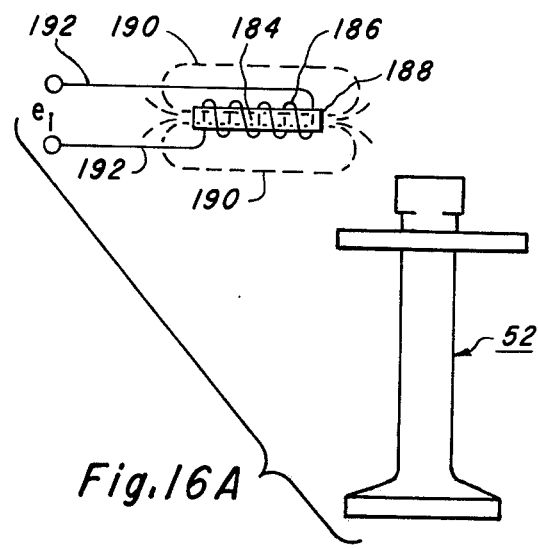
Figure 16B:
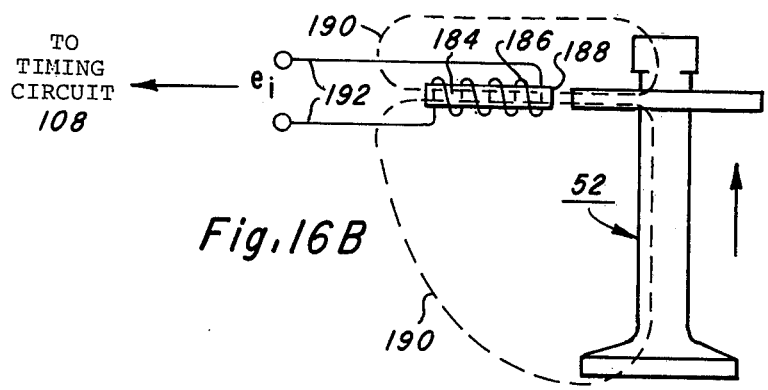

FIGS. 16A and 16B illustrate schematically the operation of the air gun of FIG. 15.

Figure 1:
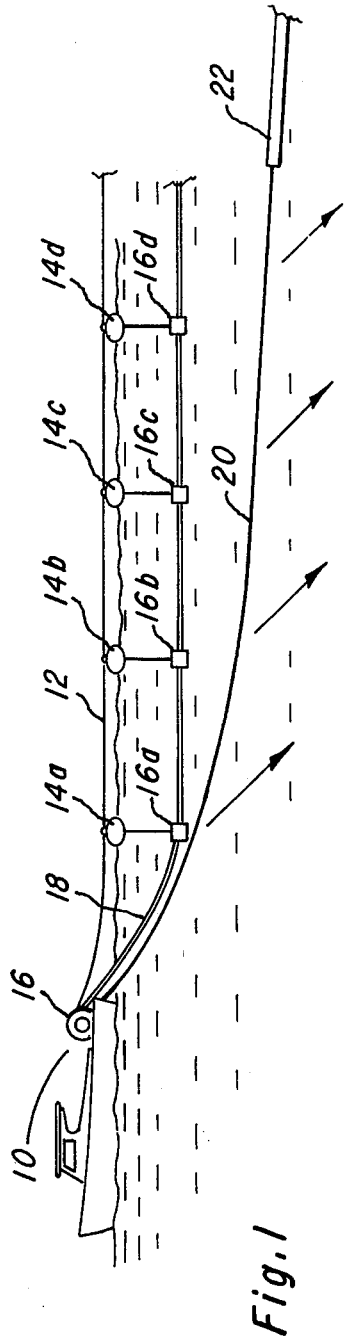
FIG. 1 illustrates a marine seismic exploration system utilizing a plurality of air guns.

FIG. 1 illustrates one example of a seismic exploration system comprising a vessel 10 streaming a cable 12 along which floats 14a–d are affixed at spaced intervals. Cable 12 is wound at one end on a reel 16 which is controlled by a suitable motor. Air guns (to be described in more detail later) 16a–d may be attached by cables or chain links from respective ones of the floats 14a–14d. Other methods are also employed for mounting the air guns for use in a marine operation. Although only four air guns are shown for simplicity of illustration, in practical application a plurality of air guns (which may be 36, for example) are utilized. Compressed air is fed to each of the guns 16a–16d via an air line 18 which is attached at one end to an air compressor (not shown) located aboard the vessel 10. While only a single air line 18 is shown for simplicity of illustration, in most instances it will be desirable to provide a separate air line for each of the air guns 16a–d (as is described in connection with FIG. 2).

The vessel 10 also streams a cable 20 along the seismic exploration traverse, the cable 20 being attached to a conventional streamer 22 which contains a plurality of acoustic receivers or hydrophones. The hydrophones in the streamer 22 generate electrical signals in response to reception of acoustic reflections caused by the generation of acoustic signals from the air guns 16a–d. The electrical signals are received on board the vessel 10 and recorded in the well-known manner for suitable processing of the seismic data.

Using a horizontal array of air guns 16a–d, such as is illustrated in FIG. 1, it is desirable to actuate each of the air guns substantially simultaneously in order that the downward going seismic energy (illustrated by the downward pointing arrows in FIG. 1) not be attenuated by destructive interference through phase misalignment.

It will be understood by those skilled in the art that a plurality of vertically space air guns (not shown) may be utilized in marine operations which will require that each of the air guns be sequentially actuated in order that the downward going seismic energy be additive, thereby minimizing attenuation which would result in poor penetration and poor resolution of the final data collected.

Figure 2:
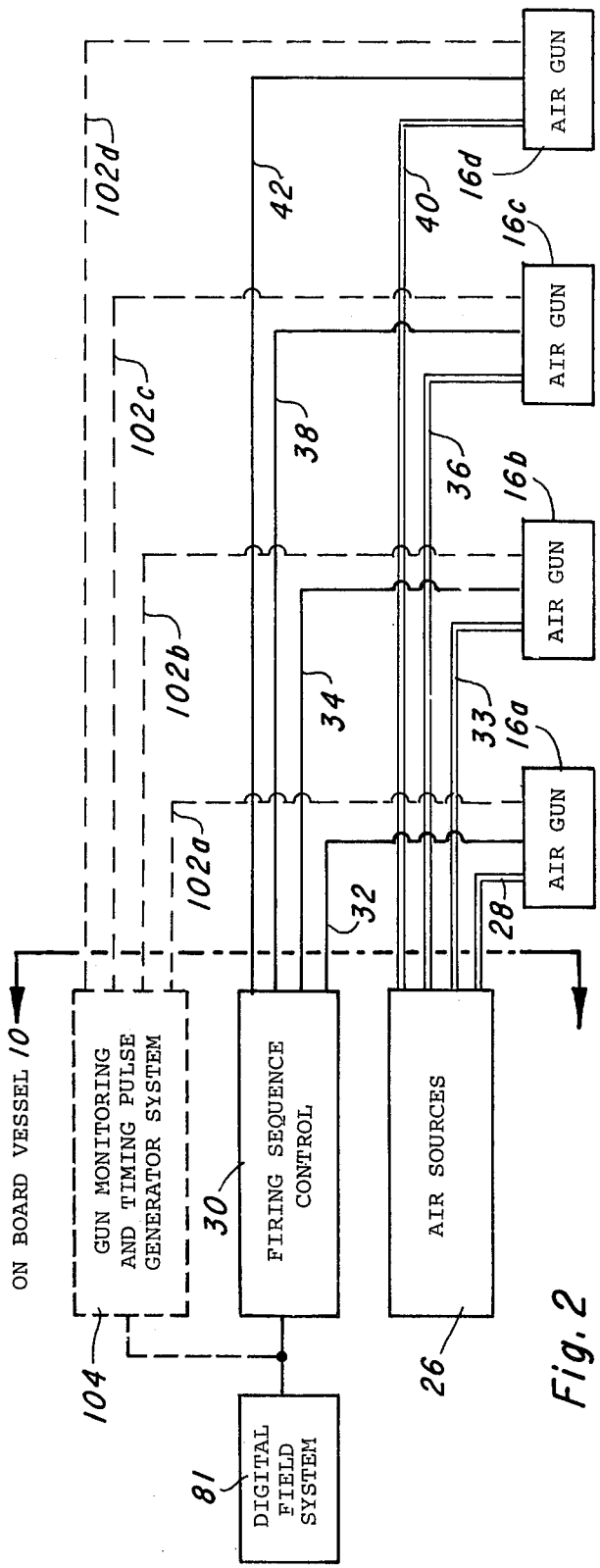
FIG. 2 illustrates the system required on board the vessel to either sequentially or simultaneously actuate a plurality of air guns.

The system for either sequentially or simultaneously actuating the air guns 16a–16d is illustrated somewhat diagrammatically in FIG. 2. The system comprises four air guns 16a–16d. Air gun 16a is connected to a source of compressed air 26 by an air line 28 and is connected to a firing sequence control circuit 30 by an electrical line 32. Air gun 16b is connected to a source of compressed air 26 by an air line 33 and to the firing sequence control by lead 34. Air gun 16c is connected to the air source 26 by an air line 36 and to the firing sequence control 30 by a lead 38. Air gun 16d is connected to the air source 26 by an air line 40 and to the firing sequence control 30 by a lead 42.

The firing sequence control 30 comprises any suitable circuit wherein electrical firing pulses may be sequentially or simultaneously and precisely generated. The source of electrical energy in the control circuit 30 may be capacitor banks. A suitable control system for discharging the capacitor banks is a system disclosed in U.S. Pat. No. 3,133,231 issued on May 12, 1964. This system includes knobs which may be rotated in order to enable manual selection of the timing sequence of the generated electrical pulses, normally called firing pulses. The firing pulses generated by the firing sequence control 30 operate electrical solenoids within the air guns to cause the underwater emission of acoustic energy.

FIG. 3 illustrates a schematic diagram of a prior art air gun (such as 16a) which basically stores high pressure gas (such as air) in a firing chamber 66 and releases it explosively through a plurality of ports 50. This instantaneous release of compressed air from ports 50 is accomplished with the use of only one major moving part, shuttle 52, consisting of a triggering piston 54 at its upper end, a firing piston 56 at its lower end and a shank 58 connecting the two. The air gun 16a illustrated in FIG. 3 is shown in the sealed position, armed and ready to fire. High pressure air from air source 26 (FIG. 2) is fed via air line 28 into the upper, or control, chamber 60 by way of orifice 62. The high pressure air passes through orifice 62, into the upper chamber 60 and through orifice 64 in the shank 58 of shuttle 52. This allows high pressure air to fill the lower, or firing, chamber 66. The shuttle 52 seats in the position shown because the pistons 54 and 56 seal their respective chambers 60 and 66 and the triggering piston 54 is of a larger diameter than the firing piston 56. Accordingly, the net force on shuttle 52 is down causing it to seat securely.

The air gun is triggered by firing sequence control 30 (FIG. 2) initiating a firing pulse to solenoid valve 68. The firing pulse from firing sequence control 30 produces a current in coil 70 which causes the metallic solenoid plunger 72 to move upward.

As shown in FIG. 4, when solenoid valve plunger 72 moves upward, the air gun 16a is triggered by the action of said plunger 72 connected, through orifices 74 and 76, recess 78 and to the control chamber 60 and the underside of the triggering piston 54. Normally, plunger 72 seals the connection between orifices 74 and 76. When solenoid valve 68 is energized by the firing sequence control 30, a current builds up in coil 70 causing plunger 72 to rise to the position shown in FIG. 4 allowing high pressure air to pass from control chamber 60 through recess 78, through orifices 74 and 76 to the underside of the triggering piston 54, thereby unseating said triggering piston 54 from its seal. Once unseated, high pressure air from within control chamber 60 surrounds the triggering piston 54 so that the net downward force on it is due only to pressure acting on the shank diameter. The firing piston 56, however, has full pressure exerted on its whole diameter (which is much larger than the shank diameter) so that shuttle 52 rapidly accelerates upward.

By the time firing piston 56 is in proximity to the location of ports 50, it has attained a substantial velocity. The air in the firing chamber 66 is therefore released quite suddenly into the surrounding water and with considerable force thereby emitting an intense acoustic pressure pulse 80 into the water.

FIG. 4 illustrates shuttle 52 in the fired position past port 50 and ready to be reseated. Shuttle 52 is decelerated and stopped due to the combined effects of the fall of driving pressure from chamber 66 towards ambient (approx. 200 psi), high-pressure air pushing down on the triggering piston 54, and the cushioning of the firing piston 56 by the water. Except for the relatively long time-constant leak through shuttle orifice 64 (FIG. 3), the high pressure air from air line 28 now acts on the shank diameter and triggering piston 54 to drive the shuttle down to its sealed position shown in FIG. 3 and air gun 16a is ready to fire again.

FIGS. 5A–5D illustrate various waveforms from two of the air guns (for example, 16a and 16b) illustrated in FIG. 1. FIGS. 5A and 5B illustrate the current pulses occurring in the coil 70 of solenoid valve 68 for air guns 16a and 16b. FIGS. 5C and 5D illustrate the resultant pressure wave resulting from the prior art simultaneous firing of air guns 16a and 16b. Referring now to FIG. 5A, at time $t_0$ a time break signal from a Digital Field System 81 (such as the Digital Field System, DFS IV, manufactured and sold by Texas Instruments Incorporated) is fed to firing sequence control 30 (FIG. 2). A firing pulse command is initiated at time $t_1$ by the firing sequence control 30 to air gun 16a which produces a current increase as illustrated in FIG. 5A. The current in coil 70 of solenoid valve 68 of air gun 16a builds up successively until the plunger 72 is moved from the seated position (shown in FIG. 3) to the unseated position (shown in FIG. 4). This movement causes a perturbation in the rising current (defined as the wicker point). This causes air gun 16a to be fired as was explained above. The same procedure is followed for air gun 16b.

In setting up an operation of an array of air guns where it is desired to have the air gun outputs occur simultaneously, the prior art method was to align the wicker points (for example 82 and 86) of the solenoid valves of the various air guns. FIG. 5B illustrates the current pulse utilized to activate air gun 16b. It will be noted that the solenoid current pulses from air gun to air gun are not uniform in shape and in practice the time of the occurrence of the wicker point is determined is sometimes difficult to define. Prior art practice dictated that the wicker point 86 of air gun 16b (FIG. 5B) be aligned with wicker point 82 of air gun 16a (FIG. 5A). In order to acomplish this, the firing pulse for air gun 16b from firing sequence control 30 must occur at time $t_1'$ (shown in FIG. 5B). When wicker point 86 is reached, air gun 16b is activated producing a hydrophone output pulse 88 from air gun 16b as illustrated in FIG. 5D.

Although plunger 72 begins to move at the time of wicker point 82, the acoustic output from air gun 16a occurs a finite time period thereafter, shown at time $t_2$ in FIG. 5C. Because of various factors, such as friction in the gun, air line leaks, etc., the time $t_2$ when the output from air gun occurs from shot to shot may vary in the order of three milliseconds. The same error variation from shot to shot occurs in air gun 16b so that even with wicker points 82 and 86 aligned, there may be a large time or phase misalignment between the outputs of the air guns thereby producing destructive interference through wave phase misalignment of the air guns. These phase errors are enlarged when guns of different volume capacities are used in the array.

Figure 8:
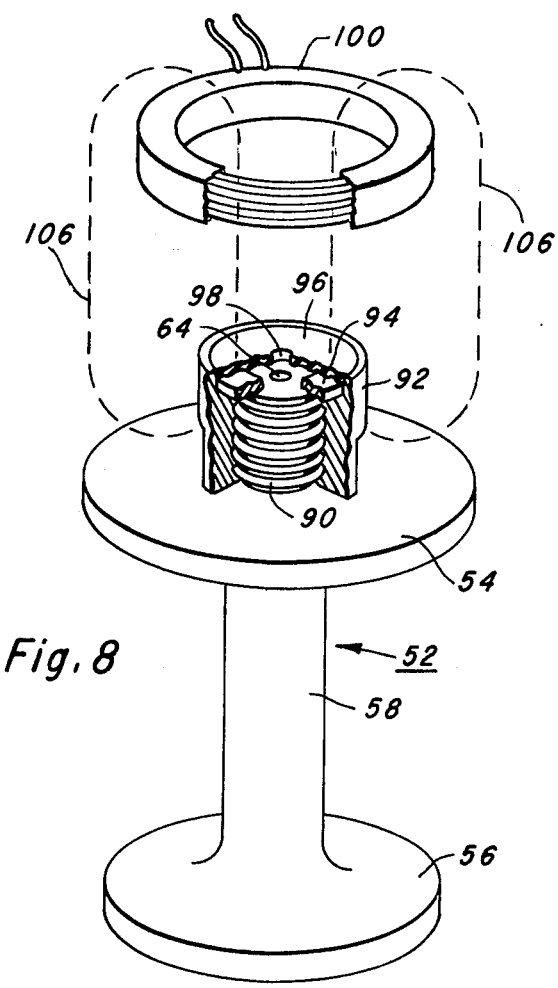
FIG. 8 illustrates a schematic break away perspective of a shuttle constructed according to the present invention.

FIGS. 6 and 7 illustrate how air gun 16a is modified according to the present invention. Like numerals designate like parts between the air gun illustrated in FIGS. 3 and 4 and FIGS. 6 and 7. Referring now to FIG. 6, the upper portion 90 of shank 58 is threaded to accommodate and fasten securely thereto nut 92. The top of nut 92 has an annular groove machined therein to accommodate a magnetic member, such as annular magnet 94. An exploded, breakaway section of shuttle 52 constructed according to the present invention is illustrated in FIG. 8. Magnet 94 is press fitted into the annular groove in order to insure a tight fit. Magnet 94 may be made of a sintered aluminum nickel allow manufactured by Arnold Engineering Company and called Alnico-8. An insulating resin 96 such as Scotchcast 280 manufactured and sold by the 3M Company covers the top surface of nut 96 except for aperture 98 which overlays shank orifice 64. It will be recognized that rather than having a separate magnet 94 inserted in the shuttle that the shuttle 52 itself may inherently have magnetic properties. The magnet 94 may be located in other locations on the shuttle 52 other than that illustrated and described.

Above control chamber 60, an electrical coil 100 shown in cross section in FIGS. 6 and 7 and schematically in FIG. 8 encircles recess 78. Two leads from the coil 100 (not shown) are connected by way of cable 102a to gun monitoring and timing system 104 (See FIG. 2). In a preferred embodiment, coil 100 is wound with approximately one hundred turns of No. 28 gauge wire. This provides a low impedance to reduce noise and minimize the effect of leakage in the return lines of the coil; leakage provides an undesirable low shunt resistance. The coil 100 is encapsulated in an epoxy to eliminate corrosion due to sea water. The dotted line portion of FIG. 2 is that additional portion required according to the present invention. Twin lead cables 102b 102c, and 102d are connected from air guns 16b, 16c and 16d, respectively (constructed in the same manner as illustrated in FIGS. 6–8) and all connected to gun monitoring and timing system 104.

Figure 9A:
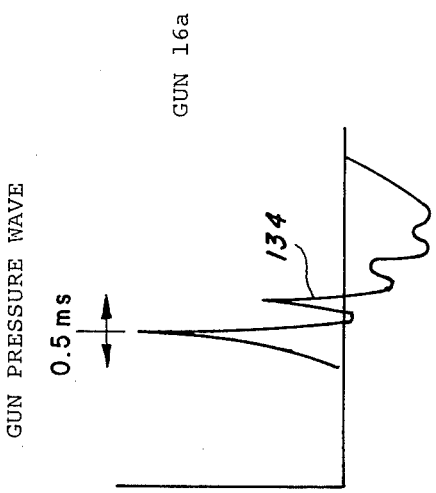
FIGS. 9A–9C illustrate various waveforms for the improved air gun constructed according to the present invention.

In operation, the improved air gun 16a of FIGS. 6 and 7 operates similarly to that operation described with respect to the prior art gun of FIGS. 3 and 4. Referring to FIGS. 6–9, at time $t_0$ (FIG. 9A), a time break signal from DFS 81 (FIG. 2) initiates a firing pulse 130 (FIG. 9A) from firing sequence control 30 and actuates the solenoid valve 68 of the air gun illustrated in FIGS. 6 and 7. When the air gun is actuated, shuttle 52 begins to unseat as shown in FIG. 7 and a voltage 132 is induced in coil 100, the waveform of which is shown in FIG. 9A. This voltage 132 induced in coil 100 is caused by flux lines 106 (FIG. 8) from magnet 94 moving through coil 100. The magnitude of the voltage 132 induced in coil 100 may be expressed as a function of the number of turns of coil 100 and the rate of change of the flux lines 106 linking coil 100. More particularly, the magnitude of voltage 132 induced in coil 100 is defined as follows:

$$e_i = N \frac{d\phi}{dt} \text{ where}$$

where
$e_i$ = induced voltage in coil 100 in volts
$N$ = number of turns in coil 100
$\phi$ = flux in webers
$t$ = time in seconds Although the electrical sensing means is shown in the above embodiment as an electrical coil, it will be understood that other sensors can be utilized to detect the magnetized shuttle 52 and its movement or position such as a semiconductor sensor manufactured by Microswitch which utilizes the Hall effect. In practice, the Hall effect semiconductor device would replace the coil 100 (shown for example in FIG. 8) such that when shuttle 52 with magnet 94 therein begins to accelerate, the Hall effect semiconductor device senses the change in flux and produces a voltage which is processed in a manner similar to that induced in coil 100.

FIG. 11 illustrates part of the circuitry included in the gun monitoring and timing system 104 (FIG. 2). A timing pulse generator circuit 108 is utilized for each improved air gun 16l–16d and comprises an amplifier 110 which may be a Model SN72741 manufactured and sold by Texas Instruments Incorporated. The output 112 from amplifier 110 is fed into a double-ended level detector 114 such as Model NE522 manufactured and sold by Signetics. The timing pulse output 116 from level detector 114 is used in the method of the invention to synchronize gun 16a with the other guns in the array (such as air guns 16b–16d in FIG. 1) and is also used in the gun monitoring and timing pulse generator system 104 to detect "auto fire" and "no fire" conditions. This latter capability will be explained hereinafter. The timing pulse output 116 from level detector 114 is also fed to one shot 118, the output 120 of which is coupled to the strobe input of level detector 114.

As the shuttle 52 unseats and begins to accelerate, the voltage 132 induced in coil 100 increases rapidly as shown in FIG. 9A. circuit 108 monitors a predetermined parameter, namely the level of voltage induced in coil 100. Amplifier 110 (FIG. 11) amplifies and buffers the voltage 132 from coil 100 which is fed to level detector 114. Also input to level detector 114 are two voltage levels, namely $\pm V_L$, where $V_L$ is the threshold level to be detected by level detector 114 (and shown in FIG. 9A). A double-ended level detector 114 is used such that if the output from coil 100 is inverted, the leading edge of the pulse (shown in non-inverted form in FIG. 9A) will still generate an output from level detector 114, namely timing pulse 116. As the voltage from coil 100 reaches a magnitude equal to $V_L$, level detector 114 fires and generates timing pulse 116 which in turn enables one shot 118. One shot 118 generates an output signal via lead 120 to the strobe input of detector 114 which disables detector 114 for approximately two milliseconds; this insures that only one timing pulse will be generated per gun shot even if a negative voltage level of $V_L$ is generated in coil 100 after the positive $V_L$ is reached. The timing pulse 116 occurring at time $t_3$ (FIG. 9B) is short in duration and may be less than one microsecond; accordingly it is seen that timing pulse 116 (FIG. 9B) occurs at the same time $t_3$ as voltage $V_L$ is reached (as shown in FIG. 9A). The pressure wave output 134 from air gun 16a is illustrated in FIG. 9C.

Figure 9B:
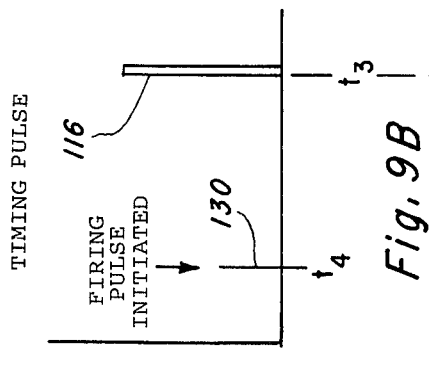
Figure 9C:
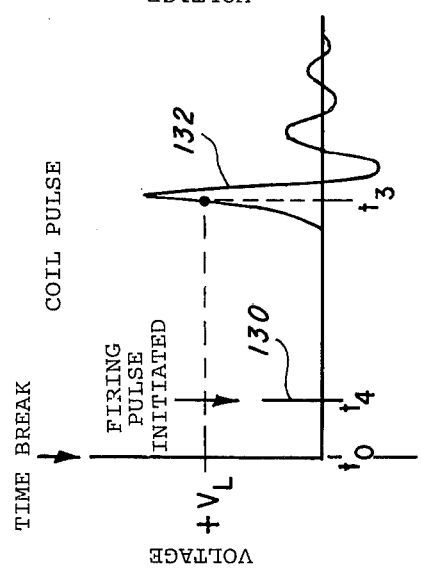
Figure 10A:
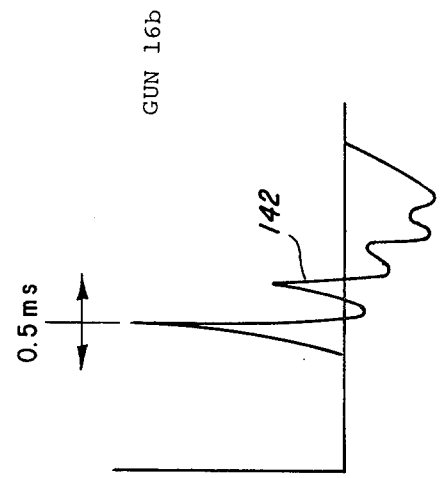
FIGS. 10A–10C illustrate various waveforms of a second air gun constructed according to the present invention and the method for synchronizing said second gun with the air gun waveforms illustrated in FIGS. 9A–9C.
Figure 10B:
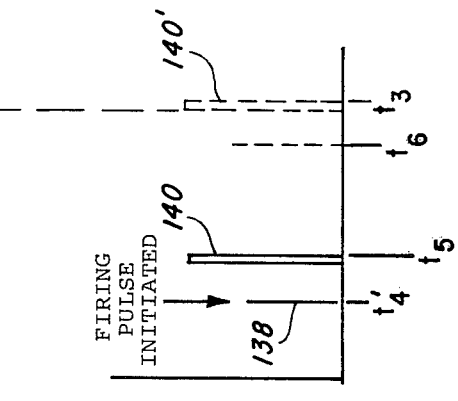
Figure 10C:
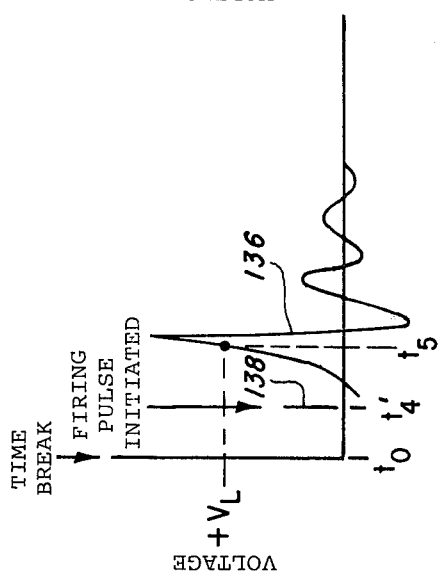

The method of aligning a second improved air gun such as was described immediately above, can best be understood by reference to both FIGS. 9 and 10. FIG. 10A illustrates the voltage waveform 136 induced in the coil 100 from a second improved air gun 16b in an array. Similar to the operation of air gun 16a, at time $t_0$ a time break signal from DFS 81 (FIG. 2) initiates a firing pulse 138 from firing sequence control 30 and actuates the solenoid valve 68 of air gun 16b at time $t_4'$. As the coil voltage 136 builds up rapidly to voltage level $V_L$, the timing pulse generator circuit 108 associated with air gun 16b causes timing pulse 140 to occur at time $t_5$ (FIG. 10B). In situations where it is desired to have guns 16a and 16b fire substantially simultaneously, the firing pulse 138 from firing sequence control 30 is delayed until time $t_6$ such that the timing pulse 140' caused by the voltage induced in the coil of improved air gun 16b will occur substantially simultaneously with the timing pulse 116 from air gun 16a (FIG. 9B). In other words, timing pulse 116 from air gun 16a and timing pulse 140' from air gun 16b both occur at time $t_3$ (as shown in FIGS. 9B and 10B). The air gun pressure wave output 142 from air gun 16b is illustrated in FIG. 10C for the situation when that air gun is fired at time $t_6$. Utilizing the improved air guns and the method of phasing each of the timing signals to occur at a predetermined time thereby insures firing and synchronization of each of the air guns 16a and 16b more accurately. It has been shown experimentally that the air gun pressure output illustrated in FIGS. 9C and 10C will vary from shot to shot in the order to 0.5 millisecond relative to the coil pulse 132. This is compared to the greater than three milliseconds variation occurring in prior art air guns of the air gun output relative to the wicker point. Accordingly, with the method described herein, much closer synchronication of a plurality of array of air guns can be obtained in spite of the many parameters which vary in each air gun, such as variations in solenoid characteristics, friction of various moving parts, etc.

Although the method described in conjunction with FIGS. 9 and 10 was for insuring that improved air guns 16a and 16b in FIGS. 9 and 10 fire simultaneously, it can readily be seen that the same advantages can be obtained when it is desired to have the two air guns fire sequentially and at extremely precise time intervals. By monitoring the shuttle movement and generating the appropriate timing pulses for each of the improved air guns, extremely accurate firing of the air guns can be obtained whether it is desired to fire such guns either simultaneously or sequentially at predetermined time intervals.

By monitoring the shuttle movement of the air gun, an additional outgrowth and advantage of the present invention is obtained which allows accurate indication of an auto fire or no fire condition. An auto fire condition occurs in an air gun when the shuttle moves releasing the stored air pressure in the lower or firing chamber automatically without a time break signal from the digital field system or firing pulse signal from the firing sequence control to the solenoid occurring. In this instance, the air gun self-produces or self-generates an acoustic output. An auto fire condition can be caused by various factors. The main reason for an auto fire is a failure of one or more of the many seals used in the air gun or solenoid; other factors may be worn or broken parts or induced foreign matter in the gun. The occurrence of an auto fire causes unwanted noise to be induced into the recorded seismic data thereby making such data difficult or impossible to process.

A no fire condition is caused when a time break signal from the digital field system and the firing pulse signal from the firing sequence control is sent to the solenoid but the air gun fails to fire. Some factors which cause a no fire condition are a broken solenoid firing line, a faulty solenoid or a rupture in the air line from the boat to the air guns.

Referring now to FIG. 12A electrical monitoring circuit 150 is illustrated which automatically detects an auto fire or no fire condition for an improved air gun constructed according to the present invention. Each air gun in an array (such as is shown in FIG. 1) would have associated with it an electrical monitoring circuit 150 such as that schematically illustrated in FIG. 12. Circuit 150 is comprised of three J-K flip-flops commonly known in the art. The J-K inputs to flip-flops A and C are connected to +5 volts and ground, respectively. The time break signal from the digital field system 81 (in FIG. 2) is connected to the clock input 152 of flip-flop A. The timing pulse signal 116 from timing pulse generator circuit 108 (of FIG. 11) is connected to conductor 154 which is coupled to the reset input of flip-flop A as well as to the clock input of flip-flop B. The $\overline{Q_A}$ is connected to the J side of flip-flop B by way of conductor 156 and the $Q_A$ side of flip-flop A is connected by way of conductor 158 to one input of AND gate 160. The $Q_B$ output 162 from flip-flop B gives the auto fire indication. A no fire enable signal (shown in FIG. 12B and which will be described in more detail hereinafter) is connected by way of conductor 164 to the second input of AND gate 160. The output 166 from AND gate 160 is connected to the clock input of flip-flop C. The $Q_C$ output from flip-flop C on conductor 168 gives the no fire indication for circuit 150.

The key to successful operation of circuit 150 lies in the fact that according to the present invention an electrical signal (for example, timing pulse 116) is generated which indicates actual shuttle movement. Accordingly, if a time break signal from the digital field system 81 is generated and no timing pulse signal is generated within a predetermined time period, then a no fire condition exists. On the other hand, if a time break signal from the digital field system 81 has not been generated (in other words no command has been initiated to fire the air gun) and a timing pulse is generated by the air gun, then an auto fire condition exists. Circuit 150 logically implements the two before-mentioned conditions.

Assume for purposes of explanation that flip-flops A, B and C are all in their normal state; then the $Q_A$, $Q_B$ and $Q_C$ outputs will all be in a "low" state. For purposes of this description, low and "high" states (zero and +5 volts) will refer to a logic "0" and logic "1", respectively. With no time break signal present (that is no command from digital field system 81 to fire an air gun) on clock input 152 to flip-flop A, $Q_A$ will be low and $\overline{Q_A}$ will be high. This means that the input to the J side of flip-flop B is enabled and if a timing pulse from circuit 108 is generated and appears on clock input line 154 to flip-flop B, the $Q_B$ side of flip-flop B will change from a low state to a high state indicating an auto fire condition.

However, assume a time break signal from digital field system 81 appears on clock input 152 to flip-flop A. This will set the $Q_A$ output to a high state and the $\overline{Q_A}$ side to a low state which is connected by way of conductor 156 to the J input of flip-flop B. Accordingly, when a timing pulse from circuit 108 appears on conductor 154 to the clock input of flip-flop B, then the $Q_B$ output remains in its low state, thereby indicating that an auto fire had not occurred (as normal operation of the air gun was in effect). This same timing pulse from circuit 108 resets flip-flop A back to its original, initial condition.

The no fire portion of circuit 150 operates as follows. A time break signal from digital field system 81 is applied by way of conductor 152 to the clock input of flip-flop A. As mentioned previously, the $Q_A$ side of flip-flop A goes from a low state to a high state; this high state is presented by conductor 158 as one input to AND gate 160. If a timing pulse is not received from circuit 108 on conductor 154 within 500 milliseconds (or other predetermined time), then a no fire enable signal (illustrated in FIG. 12B) on conductor 164 goes from a low state to a high state, thereby enabling AND gate 160 which then produces an output on conductor 166 and clocks flip-flop C. Accordingly, the $Q_C$ side of flip-flop C goes from a low state to a high state on conductor 168 and generates a no fire indication. The "no fire enable signal" is generated by the gun monitoring and timing pulse generator system 104 (FIG. 2).

Although the preceeding embodiment utilizes a mangnet associated with shuttle 52, other embodiments of the present invention may be utilized which do not employ a magnet in shuttle 52. FIG. 13 illustrates such an embodiment and, in some respects, is similar to the air gun illustrated in FIG. 7. Air gun 170 illustrated in FIG. 13 employs a coil 100 which encircles recess 78. Shuttle 52, as mentioned earlier, does not employ the use of a magnet and in the preferred embodiment is made (at least in part) of any ferromagnetic material.

FIG. 14A illustrates a simplified schematic representation of the air gun of FIG. 13 in the seated position while FIG. 14B illustrates the air gun in the unseated (fired) position corresponding to the shuttle position illustrated in FIG. 13.

Referring now to FIGS. 13 and 14A-14C, a constant current source 172 located on board the marine vessel produces a constant current I which flows through coil 100 by way of cable 102a; constant current source 172 may be any appropriate source commercially available. This constant current I flowing through coil 100 produces flux lines 174 when shuttle 52 is in the seated (unfired) position illustrated in FIG. 14A. When the air gun 170 is fired and shuttle 52 rapidly acdelerates to the position shown in FIGS. 13 and 14B, flux lines 174 change position (as shown in FIGS. 14A and 14B) thereby inducing a voltage $e_i$ as illustrated in FIG. 14C. This voltage is a function of the change in inductance of coil 100 and change in flux 174 caused by the presence of shuttle 52 in the position illustrated in FIG. 15B. The voltage $e_i$ induced in coil 100 and illustrated in FIG. 14C is coupled to processing circuitry, such as circuit 108 illustrated in FIG. 11, and processed in the same manner as described therein for monitoring and timing of air gun 170.

FIG. 15 illustrates another embodiment of the present invention and illustrates an air gun 180 which employs a magnetic sensor 182 (in lieu of the coil 100 and constant current source 172 illustrated in FIG. 13). The magnetic sensor 182 comprises a permanent magnet 184 having a coil 186 wrapped therearound. Sensing end 188 of permanent magnet 184 is exposed to and included in the control chamber 60 of air gun 180. A suitable magnetic sensor is Model 2015A manufactured by Electro Products Laboratories, Inc.

FIG. 16A illustrates the position of shuttle 52 in the seated (or unfired) position and the flux 190 induced by permanent magnet 184. When air gun 180 is fired such that shuttle 52 accelerates to the position illustrated in FIGS. 15 and 16B, the path of flux 190 will be altered as shown in FIG. 16B and thereby induce a voltage $e_i$ in coil 186 caused by the change in flux and inductance of coil 186. Conductors 192 from coil 186 are connected to appropriate processing circuitry, such as the timing circuit 108 illustrated in FIG. 11. Air gun 180 then would be synchronized and monitored in the same manner as described with respect to the air gun illustrated in FIGS. 6 and 7.

In addition to the magnetic sensor described immediately above, other approaches also could be utilized which would generate information on the position, velocity or acceleration of shuttle 52. These approaches include utilization of an inductive or capacitive proximity sensor or a linear variable displacement transformer (LVDT). Still further, a light source could be installed on one side of the upper or control chamber while a light detector would be installed on the other side. When the shuttle 52 is actuated, a signal is generated when the shuttle interrupts the light beam between the light source and the light detector, thereby indicating shuttle movement. Although the present invention has been shown and illustrated in the terms of a specific apparatus and method, it will be apparent that changes or modifications can be made without departing from the spirit and scope of the invention as defined by the appended claims.

What is claimed is

1. A method for controlling the time of firing of an air gun actuated through subjecting a shuttle to gas pressure to thereby accelerate said shuttle which releases compressed gas stored in said gun comprising the steps of:
   monitoring movement of said shuttle having magnetic properties, and
   sensing the signal produced in an electrical sensor resulting from said magnetic properties by acceleration of said shuttle is accelerated.

2. The method of claim 1 wherein said sensor is a semiconductor device.

3. The method of claim 1 wherein said sensor is an electrical coil.

4. The method of claim 1 further comprising sensing a predetermined parameter of the sensed signal.

5. The method of claim 4 wherein said predetermined parameter is the amplitude level of said sensed signal.

6. The method of claim 5 further including generating a timing signal when said amplitude level is reached.

7. The method of claim 6 further comprising the step of utilizing said timing signal to produce a no fire or auto fire condition of said gun.

8. A method for controlling the time of firing of a plurality of air guns, each actuated through subjecting a shuttle to gas pressure to thereby accelerate each of said shuttles and release compressed gas from said guns, comprising the steps of:
   monitoring the movement of each of said shuttles having magnetic properties,
   sensing in an electrical sensing circuit associated with each air gun the signals resulting from said magnetic properties produced by acceleration of said shuttles, and
   phasing each of the produced signals to occur at a predetermined time to thereby insure firing each of said guns accurately.

9. A method for controlling the time of firing of a plurality of air guns, each actuated through subjecting a shuttle to gas pressure to thereby accelerate each of said shuttles and release compressed gas from said guns, comprising the steps of:
   monitoring the movement of each of said shuttles having magnetic properties,
   sensing in an electrical sensing circuit associated with each air gun the signals resulting from said magnetic properties produced by acceleration of said shuttles, and
   generating timing signals for each of said guns when a predetermined parameter of the produced signals is obtained.

10. The method of claim 9 further comprising the step of phasing each of the timing signals to occur at a predetermined time to thereby insure firing each of said guns accurately.

11. The method of claim 9 wherein said circuit is a coil.

12. The method of claim 9 wherein said circuit is a semiconductor device.

13. The method of claim 9 wherein said predetermined parameter is the amplitude level of said signals produced.

14. The method of claim 10 wherein said timing signals are phased to occur substantially simultaneously.

15. The method of claim 10 wherein said timing signals are phased to occur at predetermined spaced intervals relative to one another.

16. The method of claim 9 further comprising the step of utilizing each of said timing signals to produce a no fire or auto fire indication.

17. An improved air gun for accurately controlling the firing thereof comprising,
   a shuttle magnetized which is accelerated from a first position to a second position when said gun is fired, and
   electrical circuit means for sensing (the signal produced when said shuttle is fired) a signal produced in response to movement of said shuttle.

18. The air gun of claim 17 wherein said circuit means is an electrical coil and said signal is induced in said coil when said magnetized shuttle is accelerated.

19. The air gun of claim 17 wherein said circuit means is a semiconductor device and said signal is induced in said device when said magnetized shuttle is accelerated.

20. An air gun according to claim 18 wherein said coil encircles a recess located in the upper portion of said gun.

21. An air gun according to claim 17 wherein said shuttle includes a magnet.

22. An air gun according to claim 21 wherein said shuttle includes an annular groove and said magnet is structured to be positioned within said groove.

23. An air gun according to claim 22 wherein said magnet is configured in the shape of a thin washer having an aperture therein.

24. An air gun according to claim 21 wherein said magnet is made of a sintered aluminum nickel alloy.

25. An air gun according to claim 22 further including a resin coating substantially covering said magnet.

26. An air gun according to claim 17 further comprising timing circuit means electrically connected to said electrical circuit means for generating a timing signal when a predetermined parameter of said signal produced occurs.

27. An air gun according to claim 26 wherein said predetermined parameter is a predetermined level of said signal produced.

28. An air gun according to claim 27 wherein said timing circuit comprises a level detector electrically connected to said electrical circuit means for producing a timing pulse when said predetermined level of said signal produced is reached.

29. An air gun according to claim 28 wherein said level detector is double-ended thereby detecting both positive and negative levels of said signal produced.

30. An air gun according to claim 28 further comprising a disabling circuit connected to said level detector for disabling said level detector thereby allowing only a single timing pulse to be generated.

31. An air gun according to claim 30 wherein said disabling circuit is a multivibrator.

32. An air gun according to claim 26 further comprising a monitoring circuit electrically connected to said timing circuit for generating an auto fire or no fire indication.

33. An air gun according to claim 32 wherein said monitoring circuit has as its inputs said timing signal, an air gun fire command signal and a second signal related to the time interval during which said air gun should have fired.

* * * * *

UNITED STATES PATENT AND TRADEMARK OFFICE
CERTIFICATE OF CORRECTION

PATENT NO. : 4,034,827

DATED : July 12, 1977

INVENTOR(S) : Arthur E. Leerskov, Jr., John T. Thomson, Jr., Frank J. Wilem, Jr. Earnest R. Harrison, Jr., Edward C. Banas, Jr.

It is certified that error appears in the above-identified patent and that said Letters Patent are hereby corrected as shown below:

Claim 1, line 10; delete "is accelerated".

Signed and Sealed this

Twenty-fifth Day of October 1977

[SEAL]

Attest:

RUTH C. MASON
Attesting Officer

LUTRELLE F. PARKER
Acting Commissioner of Patents and Trademarks